(12) United States Patent
Chau et al.

(10) Patent No.: US 12,476,862 B2
(45) Date of Patent: Nov. 18, 2025

(54) UNIFIED NETWORK MANAGEMENT FOR HETEROGENEOUS EDGE ENTERPRISE NETWORK

(71) Applicant: Hewlett Packard Enterprise Development LP, Houston, TX (US)

(72) Inventors: Uyen T. Chau, Roseville, CA (US); Chinlin Chen, Cupertino, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 600 days.

(21) Appl. No.: 17/951,476

(22) Filed: Sep. 23, 2022

(65) Prior Publication Data
US 2024/0106704 A1   Mar. 28, 2024

(51) Int. Cl.
*H04L 41/046* (2022.01)
*H04L 41/00* (2022.01)
(Continued)

(52) U.S. Cl.
CPC ........ *H04L 41/046* (2013.01); *H04L 41/0663* (2013.01); *H04L 41/0681* (2013.01); *H04L 41/0806* (2013.01); *H04L 41/0853* (2013.01); *H04L 41/20* (2013.01); *H04L 43/14* (2013.01); *H04L 67/56* (2022.05)

(58) Field of Classification Search
CPC ........... H04L 41/046–048; H04L 41/06–0695; H04L 41/08–0836; H04L 43/00–55
See application file for complete search history.

(56) References Cited

U.S. PATENT DOCUMENTS 10,379,842 B2 *   8/2019   Malladi ............ H04L 12/40006
10,437,621 B2 *  10/2019   Haque ................. G06F 9/45558
(Continued)

FOREIGN PATENT DOCUMENTS

EP        4027607 A1 *   7/2022   .............. G06F 11/30

OTHER PUBLICATIONS

C. Chen, U. Chau, A. Mercian, F. Ahmed and P. Sharma, "UnifiedNetManagement: Unified Network Management for Heterogeneous Edge Enterprise Network," 2022 IEEE International Conference on Cloud Engineering (IC2E), CA, USA, 2022, pp. 199-204.*
(Continued)

*Primary Examiner* — Brendan Y Higa
(74) *Attorney, Agent, or Firm* — Yao Legal Services, Inc.

(57) ABSTRACT

A system and method are provided which facilitate a unified network management for a heterogeneous edge enterprise network. In one aspect, the system establishes, by a cloud controller, a secure connection to an edge device in an edge network. The cloud controller deploys to the edge device a module which includes a proxy agent, thereby allowing the module to be installed on the edge device. The system monitors data obtained from the edge device based on a set of rules. Responsive to detecting a trigger condition based on the monitored data, the system performs a predetermined action corresponding to the detected trigger condition. The predetermined action can comprise sending a configuration command to be executed on the edge device or sending an action to be performed by the proxy agent on other entities communicatively coupled to the edge network (e.g., client devices and applications).

20 Claims, 6 Drawing Sheets

(51) Int. Cl.
*H04L 41/0663* (2022.01)
*H04L 41/0681* (2022.01)
*H04L 41/0806* (2022.01)
*H04L 41/0853* (2022.01)
*H04L 43/00* (2022.01)
*H04L 67/56* (2022.01)

(56) References Cited

U.S. PATENT DOCUMENTS

| | | | |
|---|---|---|---|
| 11,133,999 B1* | 9/2021 | Brosnan | H04L 47/36 |
| 11,188,437 B1* | 11/2021 | Arunachalam | G06F 9/4806 |
| 11,695,632 B1* | 7/2023 | Zoualfaghari | H04L 41/0806 709/220 |
| 11,750,489 B1* | 9/2023 | Agarwal | H04L 43/045 709/224 |
| 2012/0096171 A1* | 4/2012 | Suit | H04L 41/0816 709/227 |
| 2016/0043892 A1* | 2/2016 | Hason | H04L 41/40 709/223 |
| 2017/0033980 A1* | 2/2017 | Naous | H04L 41/0894 |
| 2019/0166031 A1* | 5/2019 | Francis | H04L 67/56 |
| 2020/0249975 A1* | 8/2020 | Shankara Murthy | H04L 41/40 |
| 2020/0328936 A1* | 10/2020 | Pérez-Aradros Herce | H04L 41/22 |
| 2020/0328978 A1* | 10/2020 | Gupta | H04L 45/306 |
| 2020/0382395 A1* | 12/2020 | Kerry | G06F 11/3476 |
| 2021/0126860 A1* | 4/2021 | Ramaswamy | H04L 45/50 |
| 2021/0234756 A1* | 7/2021 | Fong | H04L 41/0896 |
| 2022/0035651 A1* | 2/2022 | Maurya | G06F 9/547 |
| 2023/0269305 A1* | 8/2023 | Mestery | H04L 67/34 709/217 |

OTHER PUBLICATIONS

"Home—OPX (OpenSwitch)", available online at <https://www.openswitch.net/>, 2019, 2 pages.
AWS, "AWS for the Edge", available online at <https://aws.amazon.com/edge/>, 2025, 11 pages.
Cao et al., "eCaaS: A Management Framework of Edge Container as a Service for Business Workload", Apr. 26, 2021, pp. 73-78.
Chang et al., "Bringing the Cloud to the Edge", Apr. 2014, 7 pages.
Das et al., "Transparent and Flexible Network Management for Big Data Processing in the Cloud", 2013, 6 pages.
Deng et al., "Edge Intelligence: The Confluence of Edge Computing and Artificial Intelligence", Feb. 10, 2020, 13 pages.
Fortune, "The number of data breaches in 2021 has already surpassed last year's total", available online at <https://fortune.com/2021/10/06/data-breach-2021-2020-total-hacks/>, Oct. 6, 2021,.
Ganon et al., "Cloud-based Performance Testing of Network Management Systems", 2009 IEEE 14th International Workshop on Computer Aided Modeling and Design of Communication Links and Networks, 6 pages.
Greenberg et al., "The Cost of a Cloud: Research Problems in Data Center Networks", ACM SIGCOMM Computer Communication Review, vol. 39, No. 1, Jan. 2009, pp. 68-73.
HPE, "HPE Aruba Networking EdgeConnect SD-WAN", available online at <https://www.hpe.com/us/en/aruba-edgeconnect-sd-wan.html>, 2025, 9 pages.
J.P. Martin-Flatin, "Challenges in Cloud Management", May 2014, pp. 66-70, vol. 1.
Li et al., "Edge Intelligence: On-Demand Deep Learning Model Co-Inference with Device-Edge Synergy", MECOMM'18, Aug. 20, 2018, 6 pages.
Liu et al., "Toward Edge Intelligence: Multiaccess Edge Computing for 5G and Internet of Things", IEEE Internet of Things Journal, vol. 7, No. 8, Aug. 2020, pp. 6722-6747.
Mäkitalo et al., "Safe and Secure Execution at the Network Edge: A Framework for Coordinating Cloud, Fog, and Edge", Jan. 2018, 8 pages.
Mark Massé, "Rest API Design Rulebook", 2012, 114 pages.
Mercian, et al., "UDAAN: Embedding User-Defined Analytics Applications in Network Devices", Aug. 23, 2019, 6 pages.
Plastiras et al., "Edge Intelligence: Challenges and Opportunities of Near-Sensor Machine Learning Applications", 2018, 7 pages.
Sole et al., "Survey on Models and Techniques for Root-Cause Analysis", Jul. 3, 2017, 18 pages.
Wallin et al., "Rethinking Network Management : Models, Data-Mining and Self-Learning", 2012 IEEE, 8 pages.
Weng et al., "Root Cause Analysis of Anomalies of Multitier Services in Public Clouds", 2017, 6 pages.
Xiong et al., "Extend Cloud to Edge with KubeEdge ", 2018 Third ACM/IEEE Symposium on Edge Computing, 5 pages.
Yu et al., "A Survey on the Edge Computing for the Internet of Things", vol. 6, 2018, pp. 6900-6919.
Zamora-Izquierdo et al., "Smart Farming IoT Platform Based on Edge and Cloud Computing", Oct. 23, 2018, 37 pages.
Zhou et al., "Edge Intelligence: Paving the Last Mile of Artificial Intelligence With Edge Computing", vol. 107, No. 8, Aug. 2019, pp. 1738-1762.

* cited by examiner

UNIFIED NETWORK MANAGEMENT FOR HETEROGENEOUS EDGE ENTERPRISE NETWORK

BACKGROUND

Field

The explosion of data in recent years has resulted in the need to connect more of the edge network (e.g., university networks, enterprise offices, and factory networks) to a powerful cloud compute and cloud network. However, due to the heterogeneity, dis-aggregation, and varied functionalities of devices at the edge network, it can be challenging to manage the edge network in a unified manner.

BRIEF DESCRIPTION OF THE FIGURES

In the figures, like reference numerals refer to the same figure elements.

DETAILED DESCRIPTION

Figure 1:
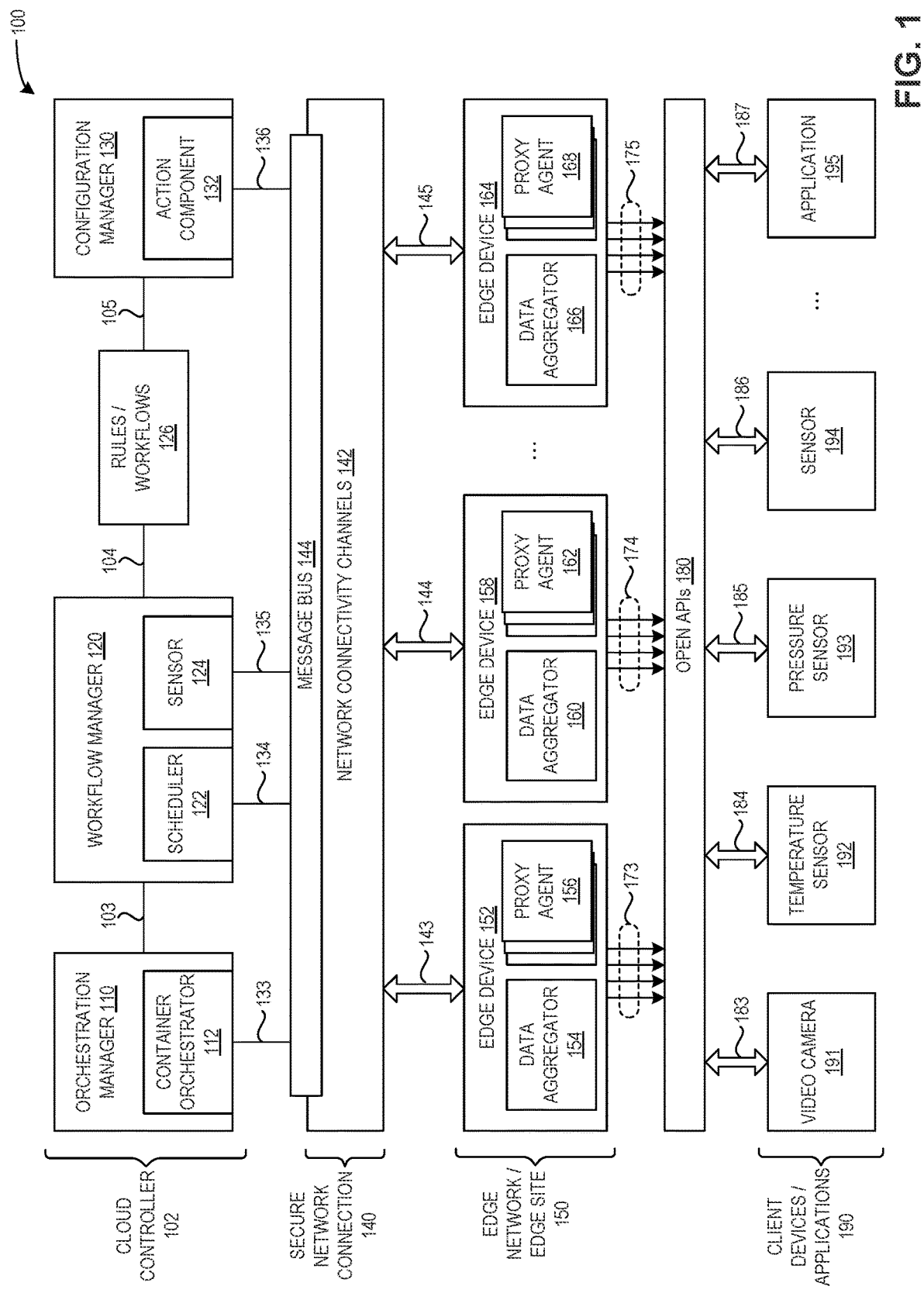
FIG. 1 illustrates a diagram of an architecture which facilitates a unified network management system for a heterogeneous edge enterprise network, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

The explosion of data in recent years has resulted in the need to connect more of the edge network to a powerful cloud compute and cloud network. Intelligent edge systems (e.g., university networks, enterprise offices, and factory networks) may fuel a growing need for artificial intelligence in the edge network. Given the limited amount of compute capacity of such edge systems, many current solutions offload most of the compute-intensive workloads to the cloud.

Furthermore, networking issues can exist at the edge networks. For example, the number of incidents of data leakage has increased in recent years, leading to increased security concerns. As a result, some customers may prefer to use on-premise management of their infrastructure. While on-premise management may provide better control over a customer's infrastructure, it may be laborious and time-consuming to fix networking issues at multiple edge sites, e.g., requiring a certain amount of human intervention. Such a situation may increase the need for expensive on-site Information Technology (IT) management teams which can triage issues, both in person and at varying and/or unpredictable times. In addition, even with an expensive on-site IT management team, a solution for one edge site may not transfer easily to another edge site, as each edge site may be isolated from other edge sites.

Using a cloud network management system from a centralized remote location may address some of the issues relating to on-premise network management (e.g., on-site network management personnel). Such a system can reduce management overheads and reduce the need for on-site personnel. While such a system may be tedious or difficult for traditional network devices which support mostly command-line interfaces (CLIs) and graphical user interfaces (GUIs), a centralized cloud network management system may be used with recently developed network devices with the help of remote accessibility application programming interfaces (APIs). Thus, as more edge networks with network devices and edge devices (along with other types of networks) are developed, a centralized cloud network management system may be increasingly prevalent due to its advantages in, e.g., zero-touch software provisioning, device remote accessibility, root-cause analysis across geo-diverse sites, etc.

However, while cloud computing may address some of the above-described issues, certain features of the edge network (e.g., the heterogeneity, dis-aggregation, and varied functionalities of edge devices) may create challenges in managing the edge network in a unified manner, i.e., using a centralized management plane to unify network management. Furthermore, it can be challenging to connect various edge sites to the cloud because the operating system (OS) of traditional network devices may not support remote accessibility.

Aspects of the instant application address this challenge by providing a unified network management system which integrates any edge network to the cloud using an event-driven workflow manager to provide monitoring, scheduling, and troubleshooting. An edge network can include any business need-driven edge network, including informational technology (IT) networks (such as campus branches, university networks, enterprise offices, medical stores, and grocery stores) as well as operational technology (OT) networks (such as factory networks, manufacturing plant networks, oil reserve networks, hospital and edge sensor networks). As edge networks grow in number and type, a unified network management system can aid in the long-lasting usability of the connected network. Some current solutions only manage proprietary network devices but not third party devices. This can result in needing multiple network management solutions in order to manage a heterogeneous network. The described aspects of the unified network management system can also eliminate the need for multiple management solutions by integrating any edge network, with both proprietary devices and third party devices, to the cloud.

Aspects of the described unified network management system can include: a cloud-based controller (or a "cloud controller"); secure network connectivity channels that establish a secure connection between the cloud controller and an edge site with a plurality of edge devices; and a proxy agent deployed and running on a respective edge device. The proxy agent can be part of a vendor-agnostic containerized client module deployed remotely in any network based on the appropriate user authentication. Furthermore, the described system can on-board edge or network devices in an edge site, collect data based on rules/workflows, perform network monitoring, and perform certain actions based on the monitored data, including causing configuration changes in the edge devices. The architecture of a unified network management system is described below in relation to FIG. 1, and an exemplary event-driven workflow is described below in relation to FIG. 2.

The term "edge site" is used in this disclosure to refer to a location (e.g., a customer location) which can host an "edge network" with hundreds to thousands of network devices in a single geographical location. The term "edge device" can refer to a network device which is hosted in an edge site.

The terms "containerized client" and "containerized client module" are used interchangeably in this disclosure and refer to a module which can include a data aggregator component and a proxy agent, as described below in relation to FIGS. 1 and 2. The term "proxy agent" is used in this disclosure to refer to software or an application which is part of a module deployed remotely in any network with appropriate user authentication (e.g., from a cloud controller to an edge device as described herein).

The terms "non-proprietary device" and "third party device" are used interchangeably in this disclosure and refer to a device which may not be under the control of or managed by the entity which manages the cloud controller and deploys the containerized client.

Diagram of a System Architecture which Facilitates a Unified Network Management System for a Heterogeneous Edge Enterprise Network As described above, aspects of the instant application provide a unified network management system for a heterogeneous edge enterprise network and can include: a cloud-based controller; a secure network channel; and a containerized client, as described below in relation to FIG. 1.

FIG. 1 illustrates a diagram 100 of an architecture which facilitates a unified network management system for a heterogeneous edge enterprise network, in accordance with an aspect of the present application. Diagram 100 can include: a cloud controller 102; a secure network connection 140; an edge network/edge site 150; and client devices/applications 190. Cloud controller 102 can include: an orchestration manager 110 which includes a container orchestrator component 112; a workflow manager 120 which includes a scheduler component 122 and a sensor component 124; rules/workflows 126; and a configuration manager 130 which includes an action component 132. Secure network connection 140 can include network connectivity channels 142 and can be associated with a message bus 144. Edge network/site 150 can include a plurality of edge devices 152, 158, and 164. Client devices/applications 190 can include: a video camera 191; various sensors, such as a temperature sensor 192, a pressure sensor 193, and a sensor (of any type) 194; and an application 195 which can include any application with which the edge devices of edge network/site 150 can interface with and from which the edge devices can obtain data.

Cloud-Based Controller

Cloud controller 102 can be a centralized controller which can be deployed on any remote server or cloud and can serve as the core of the unified network management system for enabling remote network monitoring. During operation, edge devices 152, 158, and 164 can start up and connect, register, and authenticate with cloud controller 102, which can result in establishing a secure connection between edges devices 152, 158, and 164 and cloud controller 102 (as indicated by network connectivity channels 142). Cloud controller 102 can communicate with edge devices 152, 158, and 164 via a secure network tunnel. The secure network tunnel can be indicated by network connectivity channels 142 and communications 133, 134, 135, and 136 from, respectively, container orchestrator 112, scheduler 122, sensor 124, and action component 132. Similarly, edge devices 152, 158, and 164 can communicate via the secure tunnel with cloud controller 102 as indicated, respectively, by communications 143, 144, and 145. Cloud controller 102 (and each of its indicated managers, components, or modules) can also receive messages via one or more message buses (e.g., message bus 144).

Container orchestrator 112 of orchestration manager 110 can deploy to the edge devices a module (i.e., a "containerized client," as described below) which includes a data aggregator and a proxy agent. For example: container orchestrator 112 can deploy a module to edge device 152, which causes a data aggregator 154 and a proxy agent 156 to be installed on edge device 152; container orchestrator 112 can deploy a module to edge device 158, which causes a data aggregator 160 and a proxy agent 162 to be installed on edge device 158; and container orchestrator 112 can deploy a module to edge device 164, which causes a data aggregator 166 and a proxy agent 168 to be installed on edge device 164.

Workflow manager 120 (e.g., via sensor 124) can collect specific metric data to be monitored. That is, sensor 124 can obtain data and monitor the obtained data based on rules/workflows 126. Rules/workflows 126 can be configured by cloud controller 102 or by a user associated with cloud controller 102 or, in some aspects, by a user associated with one of edge devices 152, 158, and 164, via, e.g., a graphical user interface (GUI) displayed on a display screen of a computing device associated with the user. The GUI can include elements which allow the user to view, configure, modify, and delete rules/workflows 126. The GUI can also indicate any information, alerts, messages, or notifications received via message bus 144 relating to any of client devices 190 or any device on edge network 150.

Rules/workflows 126 can include, e.g., a "device health" workflow which collects metrics on the health of a device, including a workflow in which all the edge devices report their average central processing unit (CPU) and memory usage and in which certain thresholds may be set for alerts. As another example, rule/workflows 126 can include a "route statistics" or "interface statistics" workflow which collects various metrics related to the layer-3 route-based statistics via open APIs 180 for client device 190 as well as edge devices 152, 158, and 164 (e.g., exposed statistics of all interfaces on an edge device).

Sensor 124 can serve as the interface to the proxy agent installed on an edge device and can further provide an application programming interface (API) via which to communicate with the proxy agent and other entities. Scheduler 122 can schedule the monitoring of data (metrics) to be performed by sensor 124. For example, scheduler 122 may schedule an extensive amount of monitoring of specific data during work hours in an enterprise building and may schedule a reduced amount of monitoring of the same specific data during off-hours in the same building.

Workflow manager 120 can also set alerts on various metrics, which alerts can be defined to send a notification if a certain trigger condition is detected, e.g., by comparing a health, power, or other metric to a predetermined threshold. Workflow manager 120 can predefine and store predetermined actions corresponding to a detected trigger condition, i.e., which actions are to be performed when a specific alert is sent or a certain trigger condition or event is detected.

Configuration manager 130 can collect and access the configuration of a device in order to check for changes in the configuration of the device and send commands to change the configuration. Configuration manager 130 can communicate with workflow manager 120 based on the configuration change requests (and on the monitored data obtained from an edge device as well as based on rules/workflows 126, as indicated by communications 104 and 105). For example, if sensor 124 obtains monitored data indicating that the power of a switch (e.g., edge device 152) is greater than a predetermined threshold as defined by rules/workflows 126, configuration manager 130 (e.g., via action component 132) can send a corresponding command to edge device 152 (via proxy agent 156). The command sent by configuration manager 130 can indicate to edge device 152 to power cycle edge device 152 and further to reroute traffic to mitigate any potential damage to edge device 152.

In some aspects, the monitored data can relate to client devices 190, and the command can be sent to configure a setting of one of client devices/applications 190. For example, proxy agent 156 of edge device 152 can invoke one of open APIs 180 (via a communication or protocol 173) to send the command to one of client devices/applications 190 (e.g., via one of communications 183-187). Similarly, for any command sent to proxy agent 162 of edge device 158 that is associated with one of client devices 190, proxy agent 162 of edge device 158 can invoke one of open APIs 180 (via a communication or protocol 174) to send the command to one of client devices/applications 190 (e.g., via one of communications 183-187). Additionally, for any command sent to proxy agent 168 of edge device 164 that is associated with one of client devices/applications 190, proxy agent 168 of edge device 164 can invoke one of open APIs 180 (via a communication or protocol 175) to send the command to one of client devices 190 (e.g., via one of communications 183-187).

Cloud controller 102 can thus run based on an event-driven framework. Cloud controller 102 can monitor the data obtained from the edge devices based on rules/workflows 126 by using either a pull or a push mechanism. Using the pull mechanism, cloud controller 102 can retrieve data from an edge device, e.g., based on a predetermined time period or periodic time interval. This technique can be used by many generic network management systems and can be inefficient because sensor 124 may need to continuously probe the edge device. This can result in scalability issues when edge site has thousands of network devices. On the other hand, using the push mechanism can spread the computation load to the end client devices or the edge devices. However, this can also result in a decrease in the efficiency of the performance of the edge devices.

To address this limitation, the described aspects can use the push mechanism in conjunction with the event-driven framework. The system can utilize the web socket connections (i.e., network connectivity channels 142) between all edge devices in edge network/site 150 (such as edge devices 152, 158, and 164) and cloud controller 102. The system can use one or more message buses (e.g., message bus 144). When workflow manager 120 detects a certain trigger condition, workflow manager 120 can cause configuration manager 130 to perform a predetermined action corresponding to the detected trigger condition. An exemplary workflow is described below in relation to FIG. 2.

Secure Network Connection

As described above, secure network connection 140 can include network connectivity channels 142, indicating that a secure tunnel is established between cloud controller 102 and edge network/site 150 (including edge devices 152, 158, and 164). The described aspects of the unified network management system can be hosted in a private cloud network or a public cloud network based on customer preference. Cloud controller 102 (whether hosted in a private or a public cloud network) can establish the secure tunnel between the cloud network and the edge network/site. The edge network/site may be a hybrid site, i.e., it hosts part of the edge application on-premise and part on a public cloud network (which is not necessarily the same public cloud network which may host cloud controller 102). In the case of the hybrid edge network/site, the cloud controller can establish an individual secure connection between the cloud controller and the edge site and another individual secure connection between the cloud controller and the public cloud.

Containerized Client: Data Aggregator and Proxy Agent

The module or "containerized client" deployed by orchestration manager 110 to the edge devices can include a data aggregator and one or more proxy agents, as indicated by: 154/156 deployed to edge device 152; 160/162 deployed to edge device 158; and 166/168 deployed to edge device 164. The module deployed to the edge devices can thus include a vendor-agnostic containerized client which can be deployed remotely in any network device with the appropriate user authentication.

The data aggregator of each module or containerized client can be responsible for aggregating collected analytical data. The system can monitor data metrics based on rules/workflows 126 (or other use cases). Certain metrics may require raw sampled data in order to identify the proper statistics. For example, in order to calculate high-frequency tail latency, the system may require sampling of raw latency data at a particular frequency and computing of the tail latency in the cloud controller. In another example, in order to calculate average, mean, and median statistics, the system may send the calculated metric directly from the edge device.

The described aspects can use two separate components to differentiate proprietary devices from non-proprietary (e.g., third party) devices. For example, a first HyperText Transfer Protocol (HTTP) path (such as /api/system/monitoring) can be used for proprietary devices and can instantiate advanced monitoring, since cloud controller 102 may have more control over proprietary devices. A second HTTP path (such as /api/external-system) can be used for non-proprietary devices and can instantiate a less-controlling or a lower level of monitoring which allows monitoring based on the user authorization. These two components can ensure that the system implements a minimal amount of changes in the non-proprietary devices (such as in the operating system (OS) kernel or drivers) and can further ensure that the described aspects may be utilized in all existing networks without the need for expensive device upgrades.

While the described aspects provide a way to differentiate proprietary from non-proprietary devices, in general non-proprietary devices are unlikely to reach out to cloud controller 102 unless containerized agents are installed on those non-proprietary devices. In order to do that, orchestration manager 110, via proxy agents 156, 162, and 168 on edge devices 152, 158, and 164 of edge network/site 150, can interface with non-proprietary or third party edge devices to install proxy agents on them (if the edge device supports a container framework) and control them from the cloud (e.g., via cloud controller 102). In another aspect, if a proxy agent cannot be installed directly on the third party edge device, the described system can use proxy agents on the proprietary edge devices to perform get/set operations on the third party edge devices and treat them as another client device.

The module or containerized client can be responsible for sending analytical data to cloud controller 102. For example, proxy agent 156 can be responsible for forwarding data to cloud controller 102. Proxy agent 156 can use a light-weight forward-proxy server which handles data traffic and securely transmits data through an open web socket connection. The system can automatically configure proxy agent 156 to be customized for each device in the deployed network, e.g., using subnet masks and ranges. Proxy agent 156 can also validate the user authentication so that only authenticated or authorized devices can forward analytical data to cloud controller 102.

Thus, diagram 100 illustrates the system architecture of the described aspects which can facilitate unified network management for a heterogeneous edge enterprise network, including the components of the cloud based controller (102), the secure network connection (140), and the containerized client deployed and installed on each edge device (e.g.: 154/156 on edge device 152; 160/162 on edge device 158; and 166/168 on edge device 164).

Event-Driven Workflow

As described above, the system can support both proprietary and non-proprietary devices. The cloud controller can instantiate more advanced monitoring of proprietary devices, e.g., extensive controllability that the cloud controller can establish with the proprietary edge devices. The cloud controller can also provide improved support for non-proprietary devices over current network management systems in a secure and authorized manner with minimal changes to the non-proprietary devices, using only the authentication for the user-space functionality of the non-proprietary devices.

Figure 2:
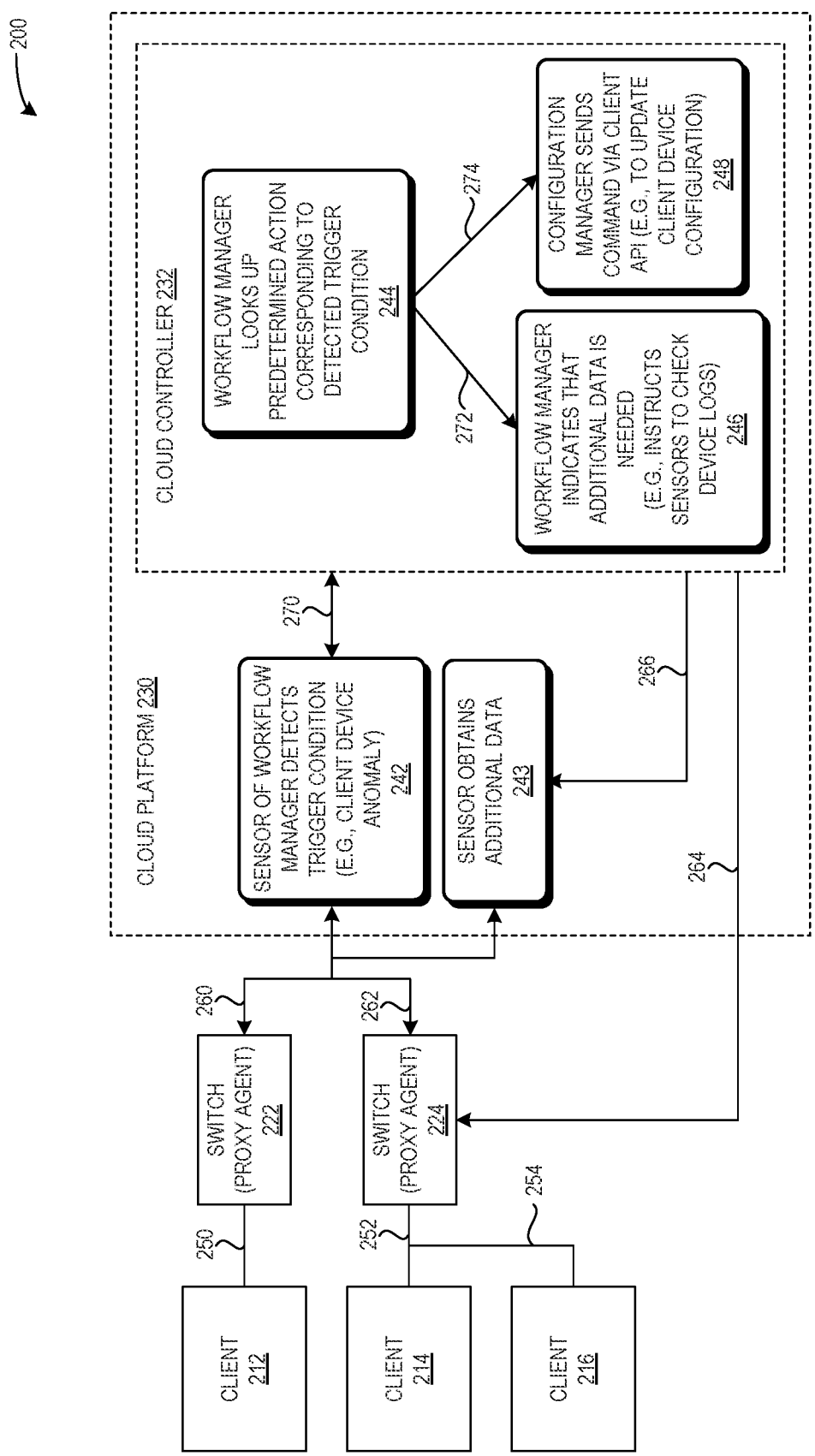
FIG. 2 illustrates an event-driven workflow based on the architecture of FIG. 1, in accordance with an aspect of the present application.

FIG. 2 illustrates an event-driven workflow 200 based on the architecture of FIG. 1, in accordance with an aspect of the present application. Workflow 200 can occur within the context of: clients 212, 214, and 216; switches 222 and 224; and a cloud platform 230. Client 212 can communicate with switch (proxy agent) 222 via a communication 250, while clients 214 and 216 can communicate with switch (proxy agent) 224 via, respectively, communications 252 and 254. Switches 222 and 224 can on-board and establish a secure connection with a cloud platform 230, which can include a cloud controller 232 (e.g., as depicted above in relation to cloud controller 102 of FIG. 1). Switches 222 and 224 (via their respective proxy agents) can send data obtained from or associated with client 212-216 to cloud platform 230 (via, respectively, communications 260 and 262).

Device On-Boarding

An edge device (e.g., switch 222) can initiate, on-board, or come online by connecting to the cloud controller (e.g., cloud controller 232 of cloud platform 230) and can also register its presence. Because a huge number (e.g., on the order of hundreds or thousands) of edge devices may come online, the described aspects may automate this operation with a start-up configuration. For proprietary devices, the system can check for authentication headers in initial packets to determine the device type and, based on the information in the authentication headers, automatically on-board the proprietary devices to the system. For non-proprietary devices, the system can allow operators or users to provide unique credentials or secret tokens which satisfy the login process. The system can use the container orchestrator platforms (e.g., orchestration manager 110 and container orchestrator 112 of FIG. 1) to establish all the edge devices as worker nodes for cloud platform 230 based on a secure network connection (e.g., a secure network tunnel indicated by network connectivity channels 142 of FIG. 1). The secure network connection can enable cloud controller 232 to deploy a containerized client to the edge devices, as depicted by the proxy agents indicated on switches 222 and 224.

Data Aggregation and Abstraction

Operators or users of the system can define multiple management workflows on cloud platform 230 or at cloud controller 232 in order to monitor specified metrics from the edge devices. As described above in relation to workflow manager 120 and rules/workflows 126, exemplary workflows can include the device health workflow (i.e., edge devices report CPU and memory usage) and the route statistics or interface statistics workflow (i.e., proxy agents obtain exposed statistics of all interfaces on the edge devices).

Another example of a workflow with advanced monitoring of a proprietary device can include a "configuration change event" workflow, in which the system can collect details about every configuration change which occurs on the edge device. Certain metrics (e.g., interface statistics) may be "pushed" to the data aggregator via an exposed data aggregator port on, e.g., edge device or switch 222, while other metrics (e.g., statistics relating to CPU and memory usage) may be "pulled" or retrieved directly from switch 222. The proxy agent (e.g., as installed or deployed on switch 222) can forward the data to sensors of cloud platform 230 (e.g., sensors of a workflow manager of cloud platform 230 or cloud controller 232).

The rules (and workflows) can be configured by cloud controller 232 or by a network operator or user associated with cloud controller 232 or cloud platform 230 or edge devices 222 and 224. The configured rules can define workflows which are to automatically executed by cloud controller 232 based on the monitored data.

Network Monitoring

Cloud platform 230 (via cloud controller 232) can utilize web sockets to collect all the data from the edge devices and can also use multiple message buses to handle the incoming data. Cloud controller 232 can create a time series of the monitored data independently for each set of metrics. The system can generate alerts as a result of incoming metric data meeting a certain condition or detecting a trigger condition, e.g., exceeding a predetermined threshold. The alerts (or detected conditions) can trigger events, which in turn can cause the system to perform predetermined actions corresponding to the detected condition. For example, in FIG. 2, cloud platform 230 can generate an alert upon detecting a trigger condition based on monitored data obtained from switch 224 (via communication 262). That is, a sensor of a workflow manager of cloud platform 230 can detect a trigger condition, such as a client device anomaly associated with switch 224 (operation 242). The alert can indicate that switch 224 is being over-utilized. The sensor of the workflow manager may instruct the workflow manager (via a communication 270) to look up the predetermined action corresponding to the detected trigger condition, and the workflow manager of cloud controller 232 can look up the predetermined action corresponding to the detected trigger condition (operation 244). Based on the predetermined action (via a communication 272), the workflow manager can indicate that an action is to be taken or that additional data is needed (e.g., instructs the sensor to investigate or check the device logs of switch 224) (operation 246). The sensors can receive this instruction (via a communication 266) and obtain the additional data (operation 243) by communicating with the proxy on switch 224).

As another example, if switch 224 is a proprietary device, a configuration manager of cloud controller 232 (such as configuration manager 130 of FIG. 1) may have access to configuration information of switch 224. The sensor of the workflow manager may instruct the workflow manager (via communication 270) to look up the predetermined action corresponding to the detected trigger condition (operation 244). The workflow manager may send the predetermined action to the configuration manager (via a communication 274), and the configuration manager may send to switch 224 (via communication 264) a command via a client API to update the client device configuration for switch 224 (operation 248).

Thus, the described exemplary workflows of FIG. 2 (including the device on-boarding, data aggregation and abstraction, and network monitoring) depict how the described aspects can deploy proxy agents to monitor and obtain data, execute workflows based on the obtained data, and provide a complete and unified network management using a single user interface.

Figure 3:
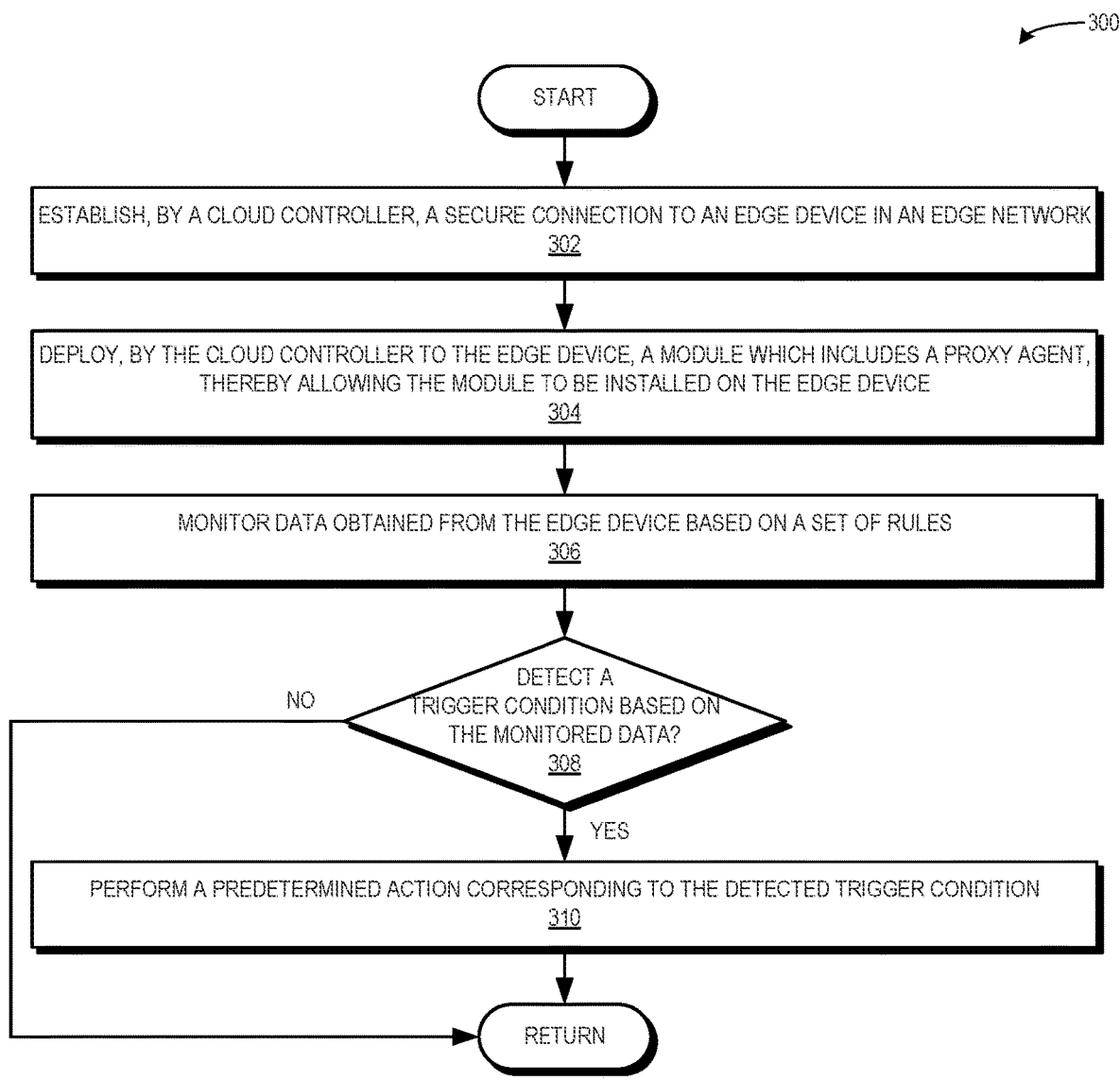
FIG. 3 presents a flowchart illustrating a method which facilitates a unified network management system for a heterogeneous edge enterprise network, in accordance with an aspect of the present application.

Method for Facilitating a Unified Network Management System for a Heterogeneous Edge Enterprise Network FIG. 3 presents a flowchart 300 illustrating a method which facilitates a unified network management system for a heterogeneous edge enterprise network, in accordance with an aspect of the present application. During operation, the system establishes, by a cloud controller, a secure connection to an edge device in an edge network (operation 302). The system deploys, by the cloud controller to the edge device, a module which includes a proxy agent, thereby allowing the module to be installed on the edge device (operation 304). The system monitors data obtained from the edge device based on a set of rules (operation 306). If the system does not detect a trigger condition based on the monitored data (decision 308), the operation returns. If the system detects a trigger condition based on the monitored data (decision 308), the system performs a predetermined action corresponding to the detected trigger condition (operation 310). The predetermined action can include sending a configuration command to the edge device, thereby allowing the proxy agent to execute the configuration command on the edge device. The detected trigger condition can be based on a comparison of a predetermined threshold to at least one of the following: a health of the edge device; a current or expected power usage of the edge device; and a metric relating to route statistics or traffic flow associated with the edge device. The predetermined action corresponding to the detected trigger condition can include at least one of: power cycling the edge device; rerouting traffic to mitigate damage to the edge device; and configuring a setting of the edge device.

Figure 4A:
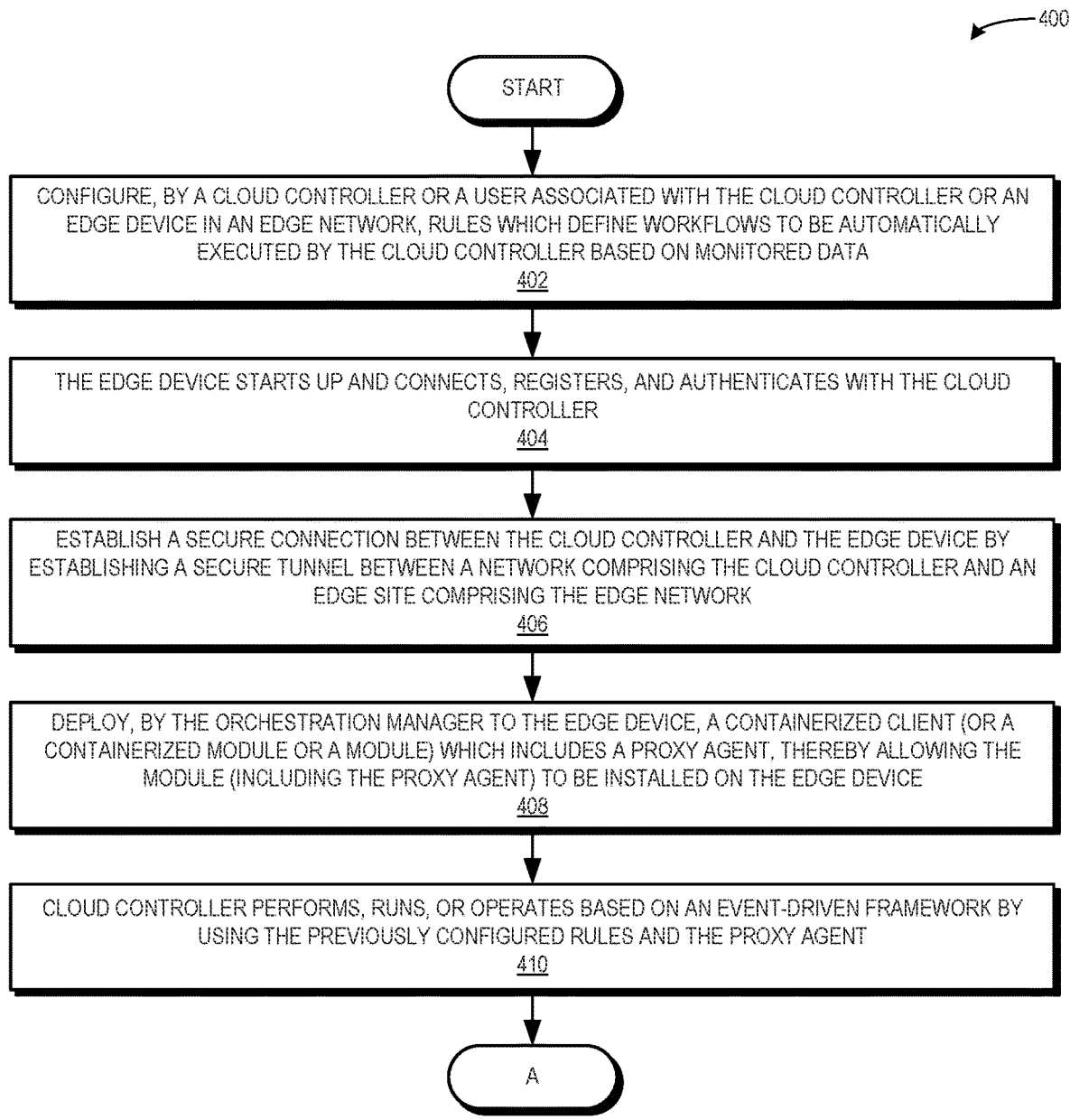
FIG. 4A presents a flowchart illustrating a method which facilitates a unified network management system for a heterogeneous edge enterprise network, in accordance with an aspect of the present application.

FIG. 4A presents a flowchart 400 illustrating a method which facilitates a unified network management system for a heterogeneous edge enterprise network, in accordance with an aspect of the present application. During operation, a cloud controller or a user associated with the cloud controller or an edge device in an edge network configures rules which define workflows to be automatically executed by the cloud controller based on monitored data (operation 402). The edge device in the edge network starts up and connects, registers, and authenticates with the cloud controller (operation 404). The system establishes a secure connection between the cloud controller and the edge device by establishing secure tunnel between a network comprising the cloud controller and an edge site comprising the edge network (operation 406).

The cloud controller can include an orchestration manager, a workflow manager, and a configuration manager. The orchestration manager deploys to the edge device a containerized client (or a containerized module or a module), which includes a proxy agent, thereby allowing the module (including the proxy agent) to be installed on the edge device (operation 408). The cloud controller performs, runs, or operates based on an event-driven framework (operation 410) and the operation continues at Label A of FIG. 4B.

Figure 4B:
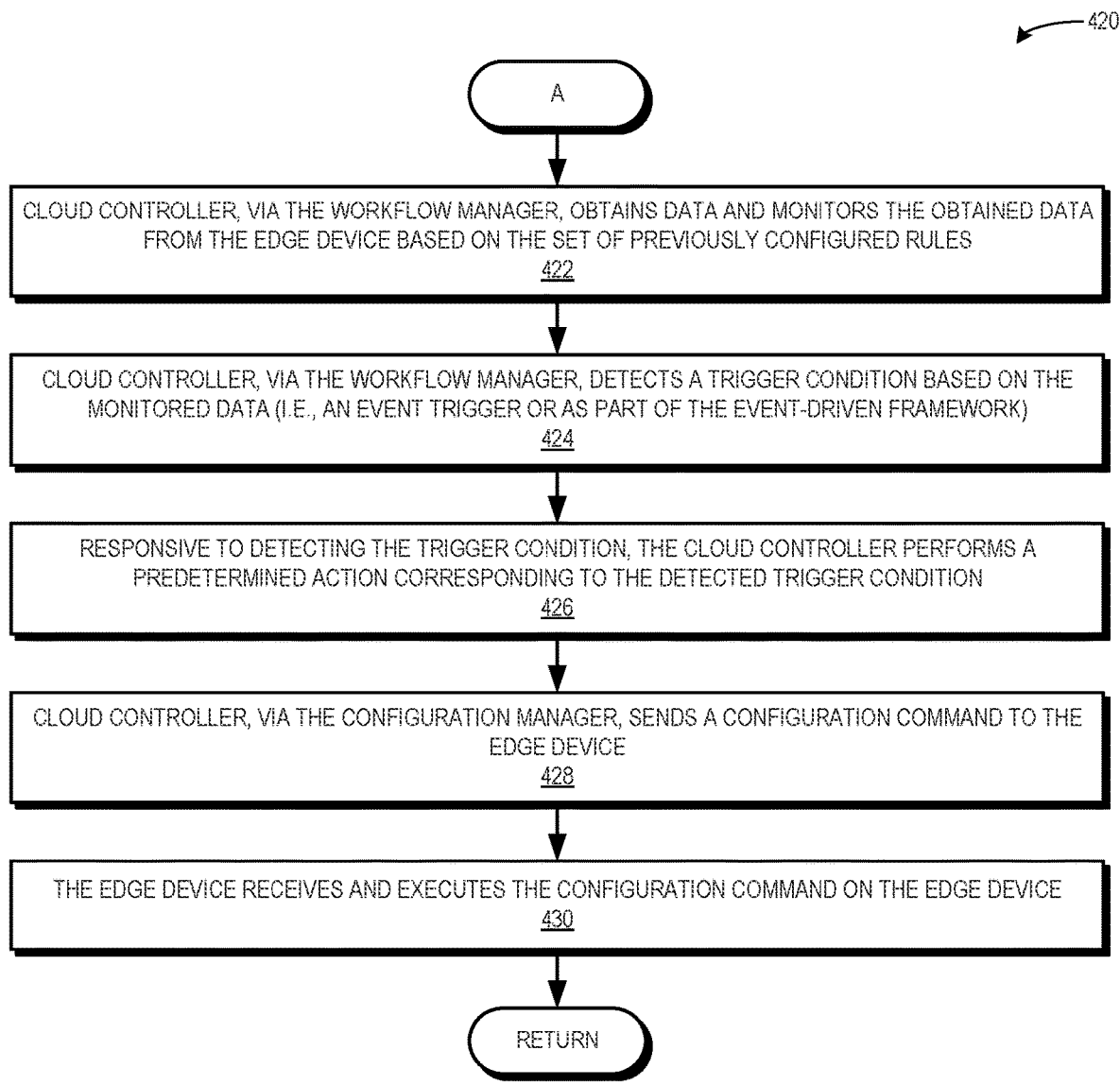
FIG. 4B presents a flowchart illustrating a method which facilitates a unified network management system for a heterogeneous edge enterprise network, in accordance with an aspect of the present application.

FIG. 4B presents a flowchart 420 illustrating a method which facilitates a unified network management system for a heterogeneous edge enterprise network, in accordance with an aspect of the present application. The cloud controller, via the workflow manager, obtains data and monitors the obtained data from the edge device based on the set of previously configured rules (operation 422). The cloud controller monitors the data using a "pull" or a "push" mechanism. The "pull" mechanism can include retrieving data from the edge device, e.g., based on a predetermined time period or time interval. The "push" mechanism can include receiving data from the edge device based on a subscription of the cloud controller to messages from the edge device. Based on the subscription, the cloud controller may receive a notification via a message bus which indicates to the cloud controller that it should query the edge device to retrieve certain data from the edge device. The notification itself may also contain the certain data, thus rendering an additional query or retrieval by the cloud controller unnecessary. In addition, the workflow manager may obtain data from the edge device (or any other edge device in the edge network) via one or more message buses.

The cloud controller, via the workflow manager, detects a trigger condition based on the monitored data, (i.e., an event trigger or as part of the event-driven framework) (operation 424). The trigger can include a certain feature (such as a health, power usage, routing statistic metric, or traffic flow metric) of the edge device reaching a predetermined threshold. Responsive to detecting the trigger condition, the cloud controller performs a predetermined action corresponding to the detected trigger condition (operation 426). This predetermined action can include, e.g., power cycling the edge device, rerouting traffic to the edge device, and configuring a setting of the edge device.

As an example, the cloud controller, via the configuration manager, sends a configuration command to the edge device (operation 428), and the edge device receives and executes the configuration command on the edge device (operation 430). As another example (not shown), the cloud controller, via the workflow manager, may send a different command to the proxy agent, and the proxy agent may use an API to send a command or a request for an action to be taken on an application or a client device which is communicatively coupled to the edge network.

Figure 5:
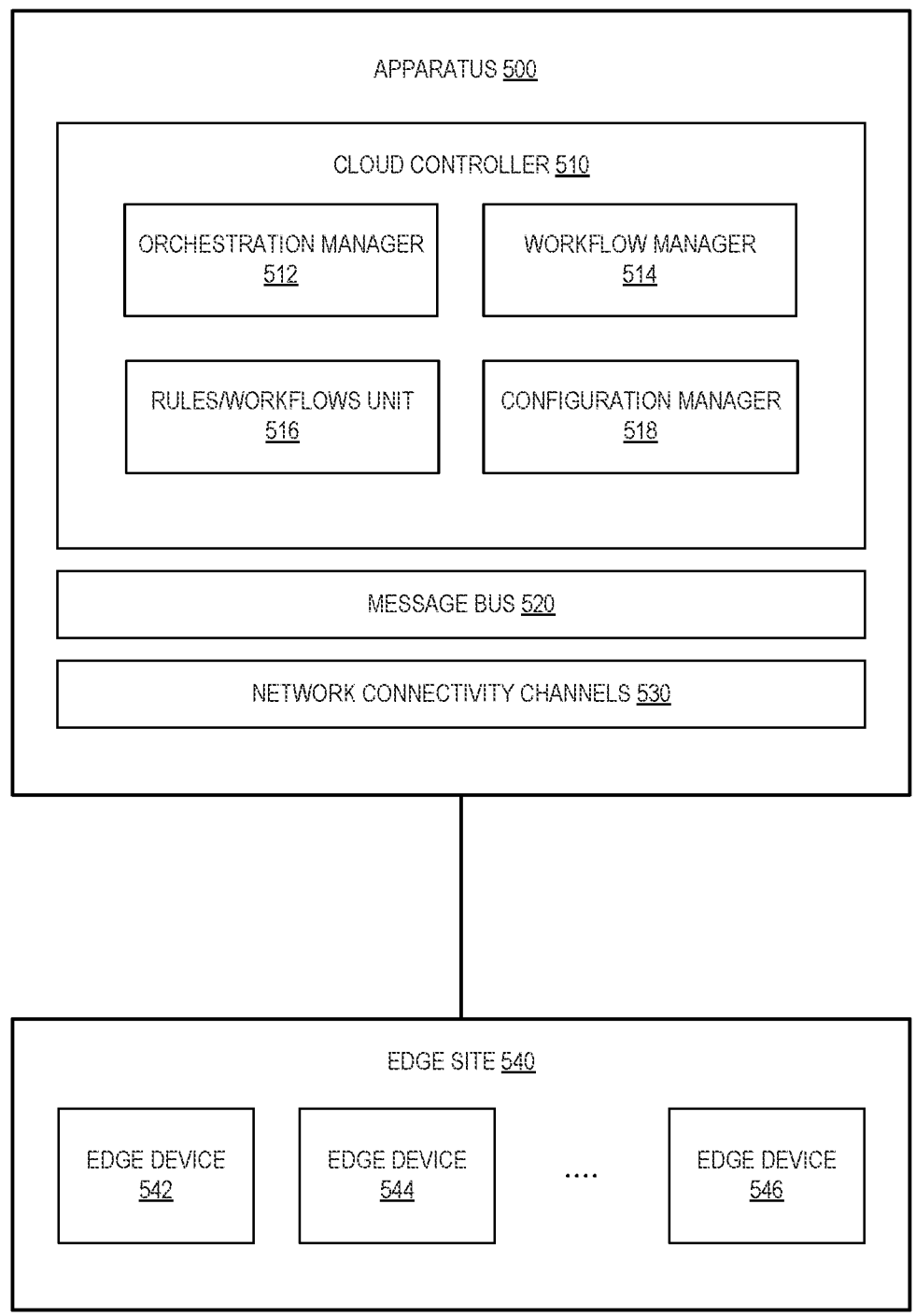
FIG. 5 illustrates an apparatus which communicates with an edge site to facilitate a unified network management system for a heterogeneous edge enterprise network, in accordance with an aspect of the present application.

Apparatus which Facilitates a Unified Network Management System for a Heterogeneous Edge Enterprise Network FIG. 5 illustrates an apparatus 500 which communicates with an edge site 540 to facilitate a unified network management system for a heterogeneous edge enterprise network, in accordance with an aspect of the present application. Apparatus 500 can include: a cloud controller 510, which can include an orchestration manager 512, a workflow manager 514, a rules/workflows unit 516, and a configuration manager 518; a message bus 520; and network connectivity channels 530. Edge site 540 can include edge devices 542, 544, and 546, which can correspond, respectively, to edge devices 152, 158, and 164 of FIG. 1. The elements, components, entities, or units described as part of apparatus 600 may perform the same operations as described above in relation to FIGS. 1 and 2.

In general, the disclosed aspects provide a method and apparatus for facilitating a unified network management system for a heterogeneous edge enterprise network. In one aspect, the system establishes, by a cloud controller, a secure connection to an edge device in an edge network. The cloud controller deploys to the edge device a module which includes a proxy agent, thereby allowing the module to be installed on the edge device. The system monitors data obtained from the edge device based on a set of rules. Responsive to detecting a trigger condition based on the monitored data, the system performs a predetermined action corresponding to the detected trigger condition, wherein the predetermined action comprises sending a configuration command to the edge device, thereby allowing the proxy agent to execute the configuration command on the edge device.

In a variation on this aspect, the system establishes the secure connection to the edge device based on the edge device starting up and connecting, registering, and authenticating with the cloud controller. The system further establishes a secure tunnel between a network comprising the cloud controller and a site comprising the edge network.

In a further variation, the module deployed to the edge device includes two or more proxy agents, and a respective proxy agent communicates via an application programming interface with the edge device, an application, a network entity, a network device, or a third party device.

In a further variation, the module deployed to the edge device comprises a vendor-agnostic containerized client which can be deployed remotely in any network device.

In a further variation, monitoring the data obtained from the edge device based on the set of rules further comprises at least one of: retrieving data from the edge device; and receiving data from the edge device based on a first message received from the edge device via a message bus, wherein the cloud controller subscribes to the first message from the edge device.

In a further variation, the first message comprises at least one of: a notification indicating to the cloud controller to retrieve certain data from the edge device; and the certain data.

In a further variation, the cloud controller comprises: an orchestration manager which includes a container orchestrator component, wherein the container orchestrator component deploys the module to the edge device; a workflow manager which includes a sensor component and a scheduler component, wherein the sensor component obtains the data from the edge device, and wherein the scheduler component schedules the monitoring of the data obtained from the edge device; and a configuration manager which includes an action component.

In a further variation, the configuration manager collects data related to a configuration of the edge device. The configuration manager checks the collected data to determine whether to change the configuration of the edge device. Responsive to determining to change the configuration of the edge device, the configuration manager sends the configuration command to the proxy agent installed on the edge device, thereby allowing the proxy agent to execute the configuration command on the edge device.

In a further variation, the rules are configured by the cloud controller or by a user associated with the cloud controller or the edge device, and the rules define workflows to be automatically executed by the cloud controller based on the monitored data.

In a further variation, the rules are configured by the user via a graphical user interface displayed on a display screen of a computing device associated with the user.

In a further variation, the detected trigger condition is further based on a comparison of a predetermined threshold to at least one of the following: a health of the edge device; a current or expected power usage of the edge device; and a metric relating to route statistics or traffic flow associated with the edge device. The predetermined action corresponding to the detected trigger condition comprises at least one of: power cycling the edge device; rerouting traffic to mitigate damage to the edge device; and configuring a setting of the edge device.

In a further variation, the predetermined action corresponding to the detected trigger condition further comprises at least one of: a first action associated with the edge device; and a second action associated with an application or a network device to which the edge device is communicatively coupled. The second action is performed on the application or the network device based on an application programming interface available to the proxy agent in the edge device.

In another aspect, an apparatus comprises a cloud controller, a message bus, and network connectivity channels. The cloud controller comprises an orchestration manager, a workflow manager, a rules/workflows unit, and a configuration manager. A secure tunnel is established between a network comprising the cloud controller and a physical site comprising an edge network. The orchestration manager deploys to an edge device in the edge network a module which includes a proxy agent, thereby allowing the module to be installed on the edge device. The workflow manager obtains data from the edge device and monitors the obtained data from the edge device based on a set of rules managed by the rules/workflows unit. Responsive to the cloud controller detecting a trigger condition based on the monitored data, the cloud controller performs a predetermined action corresponding to the detected trigger condition.

In yet another aspect, a non-transitory computer-readable storage medium stores instructions that when executed by a computer cause the computer to perform the method described above, including in relation to FIGS. 1, 2, 3, 4, and 4A. The predetermined action comprises at least one of: sending a configuration command to the edge device to be executed on the edge device; and sending an action to be performed by the proxy agent on other entities communicatively coupled to the edge network, thereby allowing the proxy agent to perform the predetermined action.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   establishing, by a cloud controller, a secure connection to an edge device in an edge network;
   deploying, by the cloud controller to the edge device, a module which includes a proxy agent, thereby allowing the module to be installed on the edge device;
   monitoring data obtained from the edge device based on a set of rules; and
   responsive to detecting a trigger condition based on the monitored data, performing a predetermined action corresponding to the detected trigger condition,
   wherein the predetermined action comprises sending a configuration command to the edge device, thereby allowing the proxy agent to execute the configuration command on the edge device.

2. The method of claim 1, wherein establishing the secure connection to the edge device is based on the edge device starting up and connecting, registering, and authenticating with the cloud controller and further comprises:
   establishing a secure tunnel between a network comprising the cloud controller and a site comprising the edge network.

3. The method of claim 1,
   wherein the module deployed to the edge device includes two or more proxy agents, and
   wherein a respective proxy agent communicates via an application programming interface with the edge device, an application, a network entity, a network device, or a third party device.

4. The method of claim 1,
   wherein the module deployed to the edge device comprises a vendor-agnostic containerized client which can be deployed remotely in any network device.

5. The method of claim 1, wherein monitoring the data obtained from the edge device based on the set of rules further comprises at least one of:
   retrieving data from the edge device; and
   receiving data from the edge device based on a first message received from the edge device via a message bus, wherein the cloud controller subscribes to the first message from the edge device.

6. The method of claim 5, wherein the first message comprises at least one of:
   a notification indicating to the cloud controller to retrieve certain data from the edge device; and
   the certain data.

7. The method of claim 1, wherein the cloud controller comprises:
   an orchestration manager which includes a container orchestrator component, wherein the container orchestrator component deploys the module to the edge device;
   a workflow manager which includes a sensor component and a scheduler component, wherein the sensor component obtains the data from the edge device, and wherein the scheduler component schedules the monitoring of the data obtained from the edge device; and
   a configuration manager which includes an action component.

8. The method of claim 7, wherein the configuration manager:
   collects data related to a configuration of the edge device;
   checks the collected data to determine whether to change the configuration of the edge device; and
   responsive to determining to change the configuration of the edge device, sends the configuration command to the proxy agent installed on the edge device, thereby allowing the proxy agent to execute the configuration command on the edge device.

9. The method of claim 1,
   wherein the rules are configured by the cloud controller or by a user associated with the cloud controller or the edge device, and
   wherein the rules define workflows to be automatically executed by the cloud controller based on the monitored data.

10. The method of claim 9,
    wherein the rules are configured by the user via a graphical user interface displayed on a display screen of a computing device associated with the user.

11. The method of claim 1,
    wherein the detected trigger condition is further based on a comparison of a predetermined threshold to at least one of the following:
    a health of the edge device;
    a current or expected power usage of the edge device; and
    a metric relating to route statistics or traffic flow associated with the edge device; and
    wherein the predetermined action corresponding to the detected trigger condition comprises at least one of:
    power cycling the edge device;
    rerouting traffic to mitigate damage to the edge device; and
    configuring a setting of the edge device.

12. The method of claim 1, wherein the predetermined action corresponding to the detected trigger condition further comprises at least one of:
    a first action associated with the edge device; and
    a second action associated with an application or a network device to which the edge device is communicatively coupled, wherein the second action is performed on the application or the network device based on an application programming interface available to the proxy agent in the edge device.

13. An apparatus comprising:
   at least one processor;
   a machine-readable storage medium comprising instructions executable by the at least one processor to implement a cloud controller comprising an orchestration manager, a workflow manager, a rules/workflows unit, and a configuration manager;
   a message bus; and
   network connectivity channels,
   wherein a secure tunnel is established between a network comprising the cloud controller and a physical site comprising an edge network,
   wherein the orchestration manager deploys to an edge device in the edge network a module which includes a proxy agent, thereby allowing the module to be installed on the edge device;
   wherein the workflow manager obtains data from the edge device and monitors the obtained data from the edge device based on a set of rules managed by the rules/workflows unit, and
   wherein responsive to the cloud controller detecting a trigger condition based on the monitored data, the cloud controller performs a predetermined action corresponding to the detected trigger condition.

14. The apparatus of claim 13,
   wherein the proxy agent communicates via an application programming interface with the edge device, an application, a network entity, a network device, or a third party device.

15. The apparatus of claim 13, wherein the configuration manager:
   collects data related to a configuration of the edge device;
   checks the collected data to determine whether to change the configuration of the edge device; and
   responsive to determining to change the configuration of the edge device, sends the configuration command to the proxy agent installed on the edge device, thereby allowing the proxy agent to execute the configuration command on the edge device.

16. The apparatus of claim 13,
   wherein the module deployed to the edge device further includes a data aggregator component which aggregates collected data, and
   wherein the proxy agent returns the aggregated collected data to a sensor component of the workflow manager.

17. The apparatus of claim 13,
   wherein the edge network comprises a plurality of edge devices.

18. The apparatus of claim 13,
   wherein the detected trigger condition is further based on a comparison of a predetermined threshold to at least one of the following:
      a health of the edge device;
      a current or expected power usage of the edge device; and
      a metric relating to route statistics or traffic flow associated with the edge device; and
   wherein the predetermined action corresponding to the detected trigger condition comprises at least one of:
      power cycling the edge device;
      rerouting traffic to mitigate damage to the edge device; and
      configuring a setting of the edge device.

19. A non-transitory computer-readable storage medium storing instructions that when executed by a computer cause the computer to perform a method, the method comprising:
   establishing, by a cloud controller, a secure connection to an edge device in an edge network;
   deploying, by the cloud controller to the edge device, a module which includes a proxy agent, thereby allowing the module to be installed on the edge device;
   monitoring data obtained from the edge device based on a set of rules; and
   responsive to detecting a trigger condition based on the monitored data, performing a predetermined action corresponding to the detected trigger condition,
   wherein the predetermined action comprises at least one of:
      sending a configuration command to the edge device to be executed on the edge device; and
      sending an action to be performed by the proxy agent on other entities communicatively coupled to the edge network, thereby allowing the proxy agent to perform the predetermined action.

20. The non-transitory storage medium of claim 19,
   wherein the module deployed to the edge device comprises a vendor-agnostic containerized client which can be deployed remotely in any network device.

* * * * *